United States Patent Office 3,201,061
Patented Aug. 17, 1965

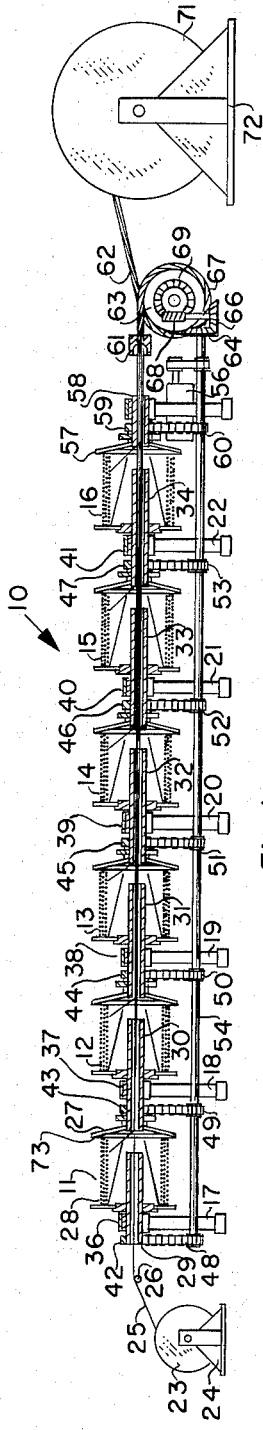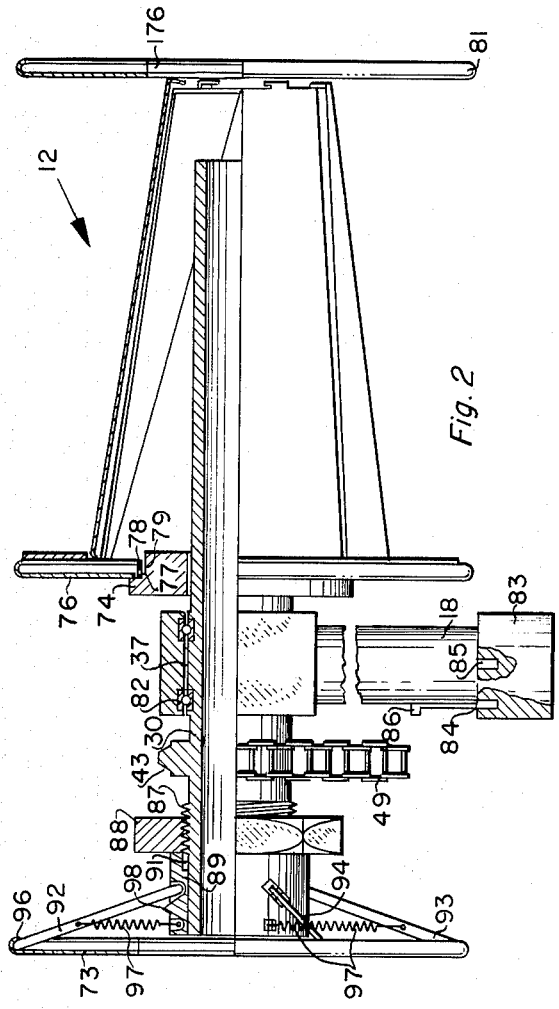
Fig. 1
Fig. 2
INVENTOR.
Victor F. Volk

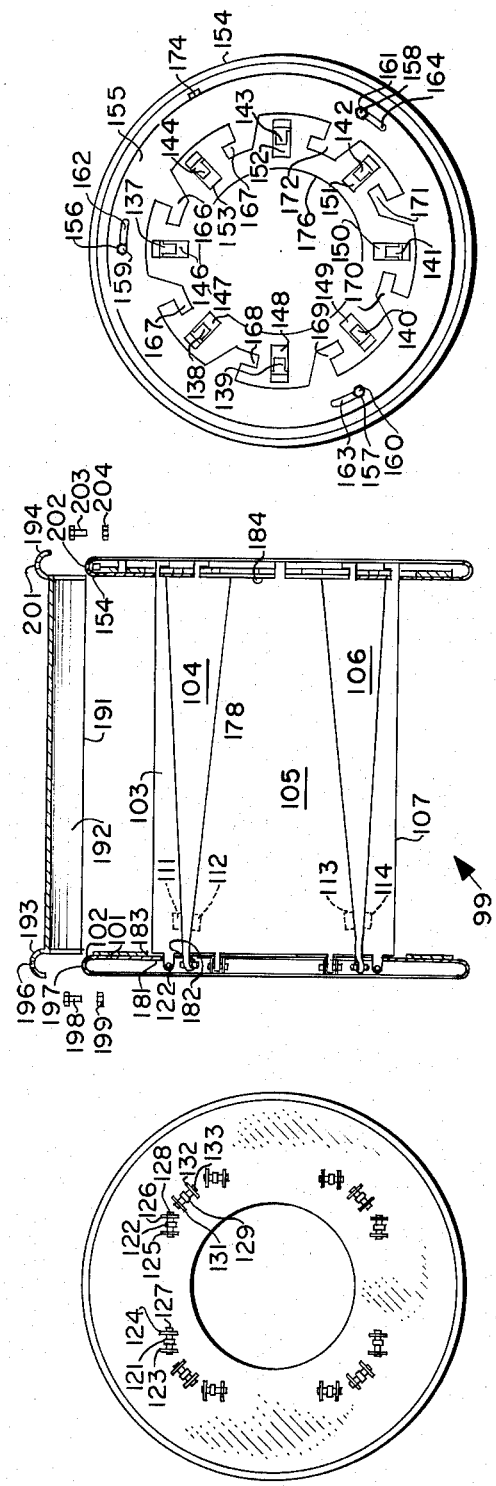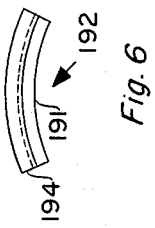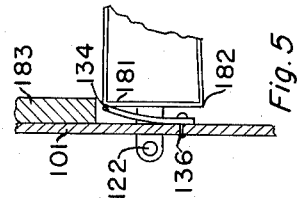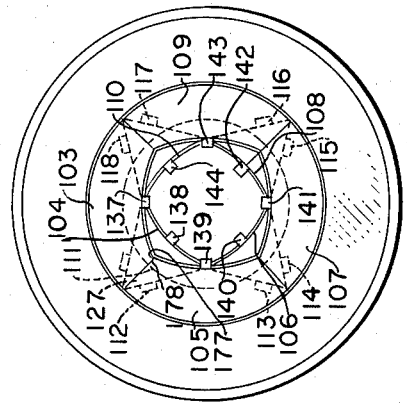

3,201,061
CABLE STRANDER REEL
Victor F. Volk, Hastings on Hudson, N.Y., assignor, by mesne assignments, to Anaconda Wire and Cable Company, a corporation of Delaware
Original application Aug. 2, 1961, Ser. No. 128,717, now Patent No. 3,124,923, dated Mar. 17, 1964. Divided and this application June 27, 1963, Ser. No. 298,512
1 Claim. (Cl. 242—115)

This application is a division of my application Serial No. 128,717, filed August 2, 1961, now Patent 3,124,923.

My invention relates to cable strander reels and particularly to such reels for paying strand from the center of a coil.

Three general types of apparatus have long been known for the twisting together of cables, ropes and other elongated strands. In the first of these the strands to be twisted are paid parallel from a plurality of fixed stations onto a reel which is made to rotate end-over-end and thereby apply a twist or spiral to the parallel group of strands feeding onto it. In the second method the strands to be twisted are contained on individual reels which are made to rotate around each other, as by all being mounted on a large vertical plate which turns on a horizontal axis. In this case the take-up station is fixed and the twist is imparted entirely by the rotation of the group of pay-off reels around a common axis. In the third method both the pay-off and take-up stations are fixed but the strands, after leaving their respective reels are swung in a loop around the pay-off reel, or around the take-up reel.

Each of these types of apparatus has serious shortcomings in cumbersomeness, inherent slow speed of operation, and low storage capacity. In the first case where the take-up reel rotates end-over-end, the total capacity of the apparatus without reloading is limited to the capacity of the reel that can be so rotated in a structure of practical size, and the speed of operation is severely limited by the centrifugal forces developed when large-sized equipment is rotated. The speed limitation imposed by centrifugal forces is even more severe in the second case where large reels are revolved bodily around each other in a vertical plane. The speed of operation of apparatus of the second type is also severely limited by consideration of unbalance since the reels are not exactly equal in weight and may not be loaded equally. The third type of apparatus is the fastest operating of the three known types but it, too, is limited by the necessity for rotating frames large enough to carry the swinging strands around the reels. A very troublesome problem in the third type of apparatus is the tensions created in the strands themselves by centrifugal force and by the friction incurred by centrifugal force when such strands are rotated in large loops at high speed.

I have invented a reel comprising a first and a second flange and a drum comprising a plurality of longitudinal members between the flanges. These drum members are hinged to swing inwardly from one of the flanges and are detachably connected to the other flanges. In one embodiment of my invention the longitudinal members are tapered with wide and narrow ends alternating at the flange. In this case the members having their wide ends hinged at the flange are closable over the remainder of the members to form a substantially continuous pyramidal surface tapering toward the other flange and guiding the strand from the inside of its coil toward the perforation in one of the flanges.

A more thorough understanding of my invention may be gained from a study of the appended drawings.

In the drawings:

FIG. 1 is a diagrammatic side elevation of a strander made to my invention.

FIG. 2 is a vertical section of one of the elements of the strander of FIG. 1.

FIG. 3 is an end view of the reel of my invention in collapsed condition.

FIG. 4a is an end view of the hinged flange of the reel of my invention.

FIG. 4b is a side view with the flanges in section of the reel of my invention.

FIG. 4c is an end view of the removable flange of the reel of my invention.

FIG. 5 is a detailed sectional view of an element of the reel of my invention.

FIG. 6 is an end view of a cover segment for the reel of my invention.

Referring to FIG. 1, a strander is shown generally at 10 suitable for forming a seven-wire strand by winding six wires around one. It will be understood that my invention is equally applicable to strands containing different numbers of wires and particularly to a two-wire strand or twin. In the apparatus shown six reels 11, 12, 13, 14, 15, 16 are supported respectively by mountings 17, 18, 19, 20, 21, 22 in a tandem alignment. An additional reel 23 is mounted on a reel stand 24 at the rear of the apparatus. The reel 23 contains a supply of wire 25 which is passed over a guide sheave 26 and through the centers of the reels 11–16. The reel 11 contains a supply of wire 27 in the form of a coil 28 and each of the remaining reels 12–16 support similar coils. A principal function of the reels 11–16 is that they provide a practical means for supporting coils of wire, such as the coil 28.

It is a novel feature that, instead of paying from the outside of the reel, the wire 27 pays off of the inside of the coil 28 through the centers of the reels 12–16. Similarly the wire on each of the reels 12–16 is seen to pay off from the inside of its coil through the centers of the more forward reels. The strand 25 in passing through the center of the reel 11 and the forward reels 12–16 necessarily passes through the center of the coil 28 and through the coils on the more forward reels. Similarly, the wire 27 in passing through the reels 12–16 necessarily passes through the coils of wire contained by these reels. Although I have shown a wire 25 and wires on the reels 11–16 it will be understood that my invention is by no means limited to metallic wire, but other types of strands may also be twisted by my apparatus. These may include fibrous strands and composite strands of various types. My apparatus is singularly well adapted for the stranding of insulated electrical conductors such as paper or plastic-insulated telephone conductors.

The mountings 17–22 support respectively pipe-lengths 29–34 in journals 36–41. The pipe-lengths 29–34 have sprockets 42–47 keyed thereto and are driven by chains 48–53 from a drive shaft 54 which is in turn driven by a motor 56. The most forward reel 16 has its forward flange 57 supported by means of a short pipe-length 58 driven through a sprocket 59 and chain 60 from the shaft 54. I have shown the pipe-lengths 29–34 and 58 driven by means of chains and sprockets but it will be understood that other means can be used for driving such as direct gearing to the shaft 54 or by armatures constructed integral with the pipe-lengths 29–34, and 58. The illustrated apparatus may be preferred for the sake of simplicity and low cost, but other drives are capable of greater speeds.

The wires 25, 27 and additional wires from the reels 12–16 are brought together at a forming die 61 at which station they are twisted together to form the strand or cable 62. The strand 62 is pulled by a capstan 63 driven from the shaft 54 by means of the bevel gears 64, 66, shaft 67, worm gear 68 and wheel 69. The strand 62 is taken up on a large cable reel 71 mounted on a reel stand 72 and driven by a take-up mechanism not shown in the drawing which may be selected from a number of such mechanisms well known to persons skilled in this art. From a consideration of FIG. 1 it will be obvious that the apparatus 10 can be operated at very high speed since the rotating elements are limited in diameter to the diameters of the flanges of the reels 11–16. As the wire 25 and the wires from the reels 11–16 advance forward they are confined in the limited diameter of the pipe-lengths 36–41 and 58. The centrifugal force acting on these wires does therefore remain moderate even at high rotational speed. Consequently there is little or no danger of wire breakage and little friction acting between the wire and the walls of the pipe-lengths.

A better understanding of one manner of assembling the reels on my apparatus 10 can be obtained from FIG. 2 which is a detail in partial section of my apparatus 10 showing the mounting 18, reel 12 and a forward flange 73 of the reel 11.

The pipe-length 30 is fitted with a collar 74 keyed to rotate with the pipe-length and adapted to receive a flange 76 of the reel 12. The collar 74 has an annular shoulder 77 from which a pin 78 projects into an opening 79 through the flange 76 by which means the reel 12 is caused to rotate at the same speed as the pipe-length 30 and the collar 74. A mating flange 81 of the reel 12 is not supported on the mounting 18 but is supported on the mounting 19 (FIG. 1) and is caused to rotate at the same speed as the remainder of the reel 12. The drum of the reel 12 is segmented and the segments are hinged at the flange 76 and are detachable from the flange 81 so that they can be swung inwardly toward the pipe-length 30. A detailed structure of the reels and manner of swinging the drum segments is shown more completely in FIGS. 3, 4, and 5 and will be described hereinafter.

The journal 37 supports the pipe-length 30 in a ball bearing 82 so that it can be rotated by means of the sprocket 43 and chain 49. The mounting 18 is itself rotatably supported in a base 83 which has key recesses 84, 85 to permit the mounting 18 to be locked in position 90 degrees apart by means of a vertical key 86 slidably mounted on the mounting 18. When the key 86 is inserted in the recess 84 the pipe length 30 is aligned with the pipe-lengths 29, 31 and when the key 86 is inserted in the recess 85 the pipe-length 30 is rotated perpendicular with the line of advance of the strands so that the reel 12 can be easily placed in position on the strander or removed therefrom. To the left of the sprocket 43 a portion 87 of the pipe-length 30 is threaded and an internally threaded collar 88 is turnable thereon. Slidably mounted on the end of the pipe length 30 and keyed thereto is an annular shoe 89 recessed at 91 to fit over the threads 87. The shoe 89 supports three arms 92, 93, 94 designed to fit under a rim 96 of the flange 73. Light springs 97—97 connect the arms 92, 93, 94 to the shoe 89 releasing the arms from the flange 73 when the shoe 89 is free to move to the right. An annular ridge 98 in the shoe 89 restricts the motion of the arms 92, 93, 94 under the influence of the springs 97—97. It will be seen that the flange 73 can be locked to the pipe-length 30 by a clockwise turning of the collar 88 forcing the shoe 89 to the left. By a similar means not shown the flange 81 is locked to the pipe-length 31 and each of the right-hand flanges of the reels 11, 13, 14, 15, 16 is locked respectively to pipe-lengths 30, 32, 33, 34, 58 (FIG. 1).

FIGS. 3–5 show a preferred embodiment of a reel 99 suitable for supporting a coil of wire on the strander 10. The reel 99 has a flange 101 with a rolled rim 102 to which are hingably mounted segments 103–110. The segments 103, 105, 107, 109 are widest in proximity to the flange 101 and taper toward the end farthest from the flange 101. The segments 104, 106, 108, 110 are narrowed to a point at the flange 101 and broader as they recede from the flange 101. At the end of the reel 99 farthest from flange 101 the widths of the segments 103, 105, 107, 109 are but slightly greater than the widths of the flanges of the segments 104, 106, 108, 110. Segment 104 has dog ears 111, 112 projecting under the segments 103, 105 respectively. The segment 106 has dog ears 113, 114 projecting under the segments 105, 107 respectively. The segment 108 has dog ears 115, 116 projecting under the segments 107, 109 respectively and the segment 110 has dog ears 117, 118 projecting under the segments 109, 103 respectively. The segment 103 is hinged by means of perforated projections 121, 122 to the flange 101 through lugs 123, 124, 125, 126 and pins 127, 128. The segment 104 terminates in a projection 129 in a plane radial to the axis of the reel 99. The projection 129 is perforated to match perforations in two parallel lugs 131, 132 projecting at right angles from the flange 101. A pin 133 passes through the perforations in the projection 129 and the lugs 131, 132 to hinge the segment 104 to the flange 101. Similarly each of the other of the segments 103–110 is hinged to lugs projecting from the flange 101. A leaf spring 134 (FIG. 5) fastened by a rivet 136 to the flange 101 urges the segment 103 inwardly. Similarly the segments 105, 107, 109 are urged inwardly by leaf springs riveted to the flange 101. The segments 104, 106, 108, 110 are forced inwardly of the segments 103, 105, 107, 109 due to the dog ears 111–118. The segments 103–110 have respectively affixed at the center of their right-hand edges one each of inwardly facing lugs 137–144. The lugs 137–144 project through slots 146–153 respectively in a flange 154 for the right end of the reel 99. A circular plate 155 is fixed to the outer surface of the flange 154 by bolts 156, 157, 158 having bolt heads 159, 160, 161 respectively and projecting respectively through arcuate slots 162, 163, 164 in the plate 155. The plate 155 has ears 166–173 extending radially inwardly and facing circumferentially in a counter clockwise direction to respectively engage the inwardly facing lugs 137–144, thereby locking the flange 154 through the segments 103–110 when the reel is being used for storing wire. When the reel has been assembled on one of the mountings, such as the mounting 18, and the flange 154 has been engaged by the arms, such as the arms 92–94, the lugs 137–144 are disengaged from the flange 154 by applying a force clockwise to a projection 174 on the plate 155 whereupon the right-hand edges of the segments 103–110 are urged inwardly by the pressure of leaf springs, such as the leaf spring 134, permitting any strand which had been coiled onto the drum formed by the segments 103–110, to be withdrawn through a central aperture 176 in the flange 154. The width of the segments 103, 105, 107, 109 is so related to the width of the segments 104, 106, 108, 110 that the right-hand edges of the segments 103, 105, 107, 109 will fold over the frame made by the right-hand edges of the segments 104, 106, 108, 110 when the reel 99 is in operating position on the strander 10. The dimensions of the segments 103, 105, 107, 109 are so chosen that an edge 177 of the segment 103 matches an edge 178 of the segment 105 when the segments are in their strand withdrawing position. Similarly each of the edges of one of the outer segments has a matching edge in one of the other of such segments with the result that the drum assumes a substantially continuous curvi-pyramidal surface tapering toward the flange 154.

The hinged edges of the drum segments such as an edge 181 of the segment 103 are relieved to provide clearance between the corners such as 182 and the flange 101 when the drum is in its collapsed position. I have therefore provided an annular spacer 183 bonded against the flange 101 to prevent wires from slipping between the flange and the drum when the drum is being wound.

At least one of the drum segments, such as the segment 105 in FIG. 4b has a notch 184 in the edge adjacent to the flange 154 to provide an opening for the leading end of the wire being wound thereon.

*Operation*

To practice the method of my invention I prefer to use the apparatus invented by me and hereinbefore described. In the use of this apparatus, wire is wound onto a plurality of reels such as the reel 12 with the drum segments locked in winding position to the flange 81 of reel 12 (corresponding to the flange 154 of the reel 99). The wire is wound on the reels in the conventional manner except that in initiating the winding a length of the wire is first inserted through the notch 184. Each of the pipe-lengths 29–34 is rotated to a position normal to their common axis and the reels 11–16 placed thereon with the flange such as the flange 76 of the reel 12 fitting over the collars such as the collar 74 of the mounting 18 and the pins such as the pin 78 fitting into the flange opening such as the opening 79. The strand 25 is threaded back to front through each of the pipe-lengths in turn starting with the pipe-length 29 and ending with the short pipe-length 58. It will be understood that instead of using the strand 25 to thread the strander 10 a length of scrap wire or rope can be used for this purpose without adversely affecting the operation of my invention. The leading ends of the wires which had been inserted into the drum notches of each of the reels 11–16, such as the notch 184 of the reel 99, are then all firmly tied to the threaded wire 25. The mounting 17 is then rotated 90 degrees to its in-line position. Following this the next mounting 18 is also rotated to its in-line position while carefully taking up the slack in the wire 25 so as to avoid pinching the wire between the mounted reels. The threaded collar 88 is then turned until the arms 92, 93, 94 engage the rim 96 of the flange 73, locking the reel 11 firmly in position on the strander 10. The element on the reel 11 corresponding to the projection 174 on the plate 155 is then tapped in a clockwise direction (FIG. 4c) so that the ears 166–173 release the drum segments and allow them to fall inwardly under the urging of the springs 134. The wire on the reel 11 is then free to pass through the space left between the ends of the drum segments and the flange 73 into the pipe-length 30 which thus constitutes a guide means for withdrawing the strand from the inside of the coil. Each of the remaining mountings 19, 20, 21, 22 is rotated in similar fashion, taking care not to pinch the slack wire, until the flange 57 of the reel 16 has been locked by the arms on the pipe-length 58. The wires are then all pulled through the center of the strander 10 until the slack has been taken up, and threaded through the die 61 over the capstan 63.

The stranding operation is then begun by starting the motor 56.

In order to contain the coil 28 on the reel 11 in a balanced condition during the stranding operation, and the corresponding coils on reels 12–16, it may be desired particularly for very fine wire to attach a plurality of cover segments such as the segment 191 (FIG. 4b and FIG. 6) to each of the reels 11–16. The segment 191 is comprised of a curved plate 192 matching closely to the outer surface of the coil 28 and flange segments 193, 194 which fit respectively over the flanges 102, 154. The flange segment 193 is provided with a bolt hole 196 matching a hole 197 in the reel flange 102 whereby the segment can be securely affixed to the flange by means of a bolt 198 and a nut 199. The flange segment 194 has a similar hole 201 matching a hole 202 in the flange 154 whereby the segment can be locked to the flange with the aid of a bolt 203 and a nut 204. It will be understood that means other than those described may be used to fix the segment 191 to the reel of my invention and that I do not wish to be limited to the means shown.

I have invented a novel, improved apparatus for twisting together elongated strands for which I desire an award of Letters Patent.

I claim:

A reel for elongated strand comprising a first flange, a second flange having a portion defining an opening therein, a drum between said flanges, said drum being comprised of axially tapered longitudinal members, each having a wide and a narrow end, means detachably securing said second flange to said drum, means hingedly connecting said members to said first flange, the wide and narrow ends of said members alternating at said first flange, said members having their wide ends hinged at said first flange being closable over the remainder of said members when said second flange is detached to form a substantially continuous curvi-pyramidal surface tapering toward said second flange, said last-mentioned members and said portion of said second flange defining an annular space for the withdrawal of strand therethrough.

References Cited by the Examiner

UNITED STATES PATENTS

| | | | |
|---|---|---|---|
| Re. 9,605 | 3/81 | Palmer | 242—129 |
| 869,010 | 10/07 | McIntyre | 242—118.6 |
| 1,400,936 | 12/21 | Bull | 242—110 |
| 2,047,434 | 7/36 | Schurmann | 242—118.61 |
| 2,154,343 | 4/39 | McDermott | 242—110.1 X |
| 2,292,545 | 8/42 | Proctor | 242—118.61 |
| 2,695,142 | 11/54 | Fons et al. | 242—115 |

MERVIN STEIN, *Primary Examiner.*

RUSSELL C. MADER, *Examiner.*